United States Patent [19]

Hennion

[11] 4,080,557
[45] Mar. 21, 1978

[54] BATTERY OPERATED CIRCUITS AND A.C. CHARGER MEANS

[75] Inventor: Trevor Francis Hennion, Swindon, England

[73] Assignee: George Kent Limited, Luton, England

[21] Appl. No.: 737,574

[22] Filed: Nov. 1, 1976

[30] Foreign Application Priority Data

Oct. 31, 1975   United Kingdom ............... 45454/75

[51] Int. Cl.² .......................... H02J 7/02; H03H 5/04
[52] U.S. Cl. ......................................... 320/2; 307/30; 320/5; 320/51; 333/24 C
[58] Field of Search ........................................ 320/2–5, 320/14, 11, 51; 333/24 C; 307/30

[56] References Cited

U.S. PATENT DOCUMENTS

| | | | |
|---|---|---|---|
| 3,109,132 | 10/1963 | Witte | 320/2 X |
| 3,544,877 | 12/1970 | Erath | 320/2 |
| 3,909,821 | 9/1975 | Jagoda et al. | 333/24 C X |

Primary Examiner—Robert J. Hickey
Attorney, Agent, or Firm—Kirschstein, Kirschstein, Ottinger, Frank & Cobrin

[57] ABSTRACT

Rechargeable batteries powering an electric circuit which produces a signal at an output terminal in response to an input, are connected with the output terminal through a rectifier and a capacitor so that in normal use the capacitor isolates the batteries from the terminal but so that the batteries may be recharged in situ by the external application of an alternating charging voltage to the terminal.

5 Claims, 2 Drawing Figures

BATTERY OPERATED CIRCUITS AND A.C. CHARGER MEANS

This invention relates to electrical circuit means having one or more rechargeable batteries.

It is an object of this invention to provide an improved form of such electrical circuit means which allows the batteries to be recharged through an output connection of the electrical circuit means.

Accordingly, the present invention consists in electrical circuit means having input and output connections and adapted to be powered by a rechargeable battery, wherein there are provided rectifier means for connection with the battery and capacitor means connected between the rectifier means and the output connections, the capacitor means serving to present a high impedance to a signal generated by the electrical circuit means at the output connection and a low impedance to an alternating charging voltage applied to the output connection, the rectifier means serving to rectify said alternating voltage for charging of the battery.

The invention will now be described by way of example with reference to the accompanying drawing, in which.

Figure 1:
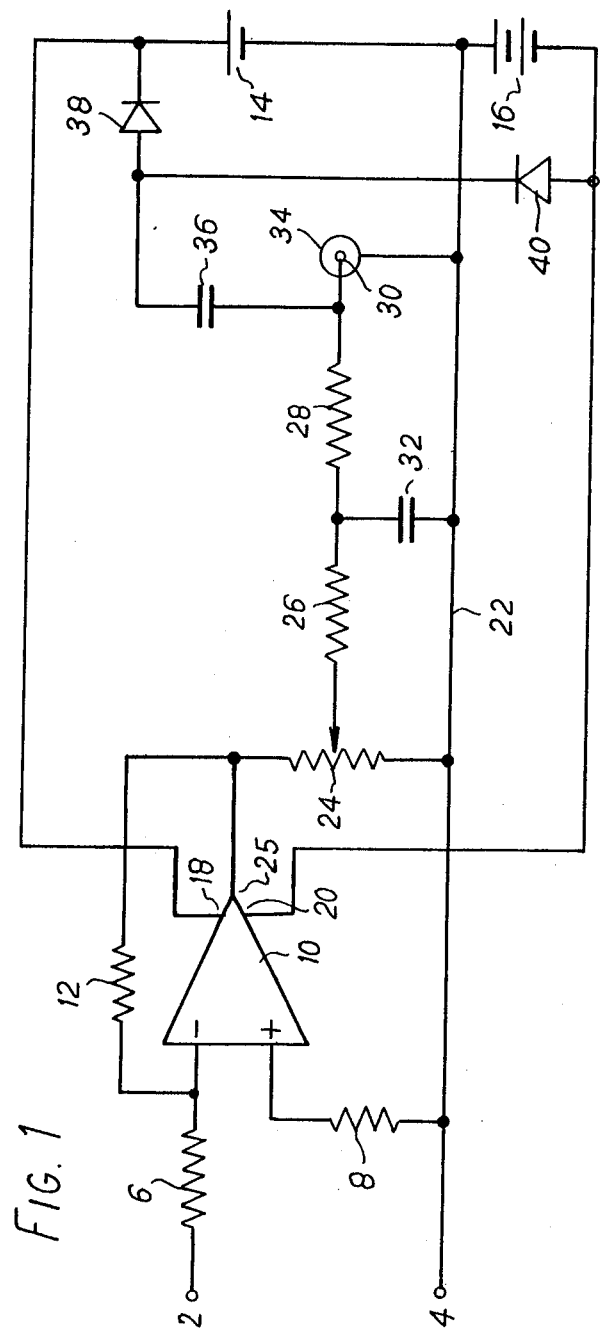
FIG. 1 is a circuit diagram of a circuit embodying the present invention.

The circuit has input connections 2 and 4 connected by respective resistors 6 and 8 to an operational amplifier 10 having a feedback resistor 12. The amplifier is powered by rechargeable batteries 14 and 16 which are connected in series, with their e.m.f's additive, between terminals 18 and 20 of the amplifier. Rail 22 is connected between the input connection 4 and the junction of batteries 14 and 16.

Potentiometer 24 is connected between the output terminal 25 of the amplifier 10 and rail 22; its wiper being connected to output connection 30 via resistors 26 and 28. The junction of resistors 26 and 28 is connected to rail 22 via capacitor 32. Resistor 26 and capacitor 32 together constitute an output filter. The second output connection 34 of the circuit is connected to rail 22.

A capacitor 36 is connected between output connection 30 and rectifying means comprising diodes 38 and 40; the anode of diode 38 and the cathode of diode 40 being connected together and to capacitor 36. The cathode of diode 38 is connected to the positive terminal of battery 14 and the anode of diode 40 is connected to the negative terminal of battery 16.

In the normal operation of the circuit, an output voltage is presented at output connections 30 and 34 in response to the external application of an input signal to input connections 2 and 4. This output voltage would typically be a steady voltage and hence is prevented by capacitor 36 from reaching the rectifying diodes 38 and 40. If it is desired to charge the batteries, a 50 Hz charging voltage would be applied across output connections 30 and 34. This charging voltage would most usefully be a sine-wave derived from the ordinary 50 Hz mains supply. Current will then flow through capacitor 36 and, on alternate half cycles, through diodes 38 and 40 to recharge batteries 14 and 16. Resistor 28 and capacitor 32 together act as a low pass filter and are chosen to minimize the amount of the 50 Hz charging voltage which appears at the output terminal 25 of the amplifier 10.

It will be realised that the circuit arrangement described above is also applicable to certain cases where the output voltage of the circuit is not steady but oscillatory. It will sometimes be possible to choose a value for capacitor 36 and a frequency of charging voltage such that the impedance of capacitor 36 to the output voltage is high enough for the diodes 38 and 40 to be substantially isolated from the output connection in normal operation of the circuit, whilst upon application of high frequency charging voltage the capacitor 36 will pass sufficient current to the diodes 38 and 40 to recharge the batteries.

Whether the output signal is a steady voltage or a low frequency alternating voltage, it will be seen that capacitor 36 presents a high impedance to the output signal but a low impedance to an alternating voltage. The alternating charging voltage may have any convenient frequency, and the description of a 50 Hz voltage derived from the mains supply is only by way of example.

A typical example of the use of electrical circuit means according to the invention is in probes or other measuring devices which have certain amount of internal circuitry requiring an internal battery but which need to be connected to an external meter by a flexible lead.

Figure 2:
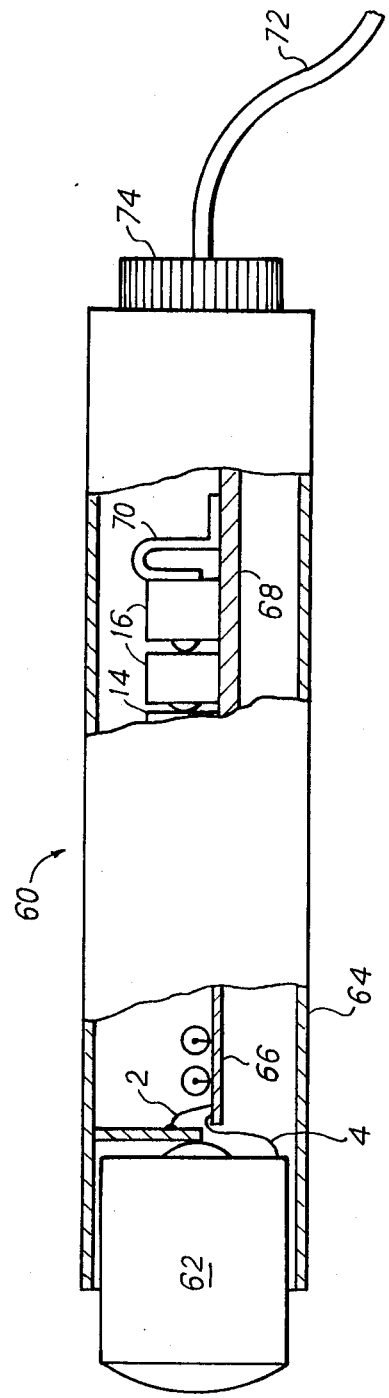
FIG. 2 shows the circuit of FIG. 1 mounted within a probe.

With reference now to FIG. 2, a dissolved oxygen probe 60 has an electrochemical sensor 62 mounted at one end of a generally cylindrical probe body 64. A printed circuit board 66 containing the circuit shown in FIG. 1 with the exception of batteries 14 and 16, is mounted within the probe body with input connections 2 and 4 connected with the sensor 62. Batteries 14 and 16 are supported on a battery carrier 68 and are held in place by a battery spring 70. A lead 72 is connected internally of the probe with the output connections 34 and 30 and is clamped to the probe body with mounting bush 74.

In normal use of the probe, the signal produced by the sensor 62 on detection of dissolved oxygen is amplified by operational amplifier 10 and is transmitted through lead 72 to an external meter for measurement. When the batteries require recharging, the lead is disconnected from the meter and plugged into a charging adapter supplying a 50 Hz voltage. The batteries are thus charged as hereinbefore described with the low pass filter comprising capacitor 32 and resistor 28 serving to prevent the 50 Hz voltage from appearing at the input connections 2 and 4 and damaging the sensor.

A probe having an electrochemical sensor and internal circuitry is described in greater detail and is claimed in copending application No. 45453/75, to which reference is directed.

What we claim is:

1. An electric circuit including:
   (A) output connections for selective connection to a utilization means or to an alternating charging voltage,
   (B) battery connections,
   (C) a rechargeable battery connected to said battery connections,
   (D) means to provide an electric signal at said output connections powered by said battery,
   (E) rectifier means connected with said battery connections,
   (F) capacitor means, and
   (G) a circuit path connecting the rectifier means and the output connections, said capacitor means being in said circuit path, (H) said path being separate from said electric signal providing means, (I) the capacitor means having such an impedance as substantially to block said electric signal and to transmit to the rectifier means an alternating charging voltage applied to the output connections, (J) the rectifier means rectifying said alternating voltage for charging of the battery.

2. Electrical circuit means according to claim 1, further comprising a terminal at which said electrical signal appears and a low pass filter connected between said terminal and said output connection, the low pass filter being adapted to transmit said electrical signal and to block said alternating charging voltage.

3. Electrical circuit means according to claim 2, further comprising an amplifier having an output thereof connected with said terminal, the amplifier being connected with the battery connections to receive power from the rechargeable battery.

4. A probe having a sensor and the electric circuit according to claim 5 mounted within the probe, the electric circuit being connected with the sensor to receive an input signal therefrom.

5. A probe having a sensor and an electric circuit according to claim 3 mounted within the probe, said probe further including a lead for connection with the utilization means, the utilization means constituting an external meter, said probe being connected with said output connections, said amplifier being adapted to receive an input signal from the sensor, said battery being rechargeable by the application remotely from the probe of an alternating charging voltage to the lead.

* * * * *